United States Patent [19]

Eoff

[11] Patent Number: 5,290,357

[45] Date of Patent: Mar. 1, 1994

[54] ACETONE/FORMALDEHYDE/CYANIDE RESINS

[75] Inventor: Larry Eoff, Duncan, Okla.

[73] Assignee: Halliburton Company, Duncan, Okla.

[21] Appl. No.: 996,343

[22] Filed: Dec. 22, 1992

[51] Int. Cl.5 .................. C04B 24/12; C04B 24/16
[52] U.S. Cl. .................... 106/808; 106/802; 106/809; 106/823; 524/650; 568/313; 558/315
[58] Field of Search ............ 106/724, 808, 819, 823, 106/802, 809; 166/285, 293; 252/8.551; 524/650; 568/313; 558/315

[56] References Cited

U.S. PATENT DOCUMENTS

| | | | |
|---|---|---|---|
| 4,219,471 | 8/1980 | Detroit | 106/823 |
| 4,557,763 | 12/1985 | George et al. | 166/293 |
| 4,585,853 | 4/1986 | Plank et al. | 528/227 |
| 4,657,593 | 4/1987 | Aignesberger et al. | 252/312 |
| 4,666,979 | 5/1987 | Plank et al. | 525/54.21 |
| 4,818,288 | 4/1989 | Aignesberger et al. | 252/312 |
| 4,941,536 | 7/1990 | Brothers et al. | 166/293 |
| 5,035,812 | 7/1991 | Aignesberger et al. | 252/8.51 |

FOREIGN PATENT DOCUMENTS 0078938 5/1983 European Pat. Off. .

OTHER PUBLICATIONS

"Well Cementing" Edited by Erik B. Nelson (Developments in Petroleum Science, 28) Elsevier, 1990.

*Primary Examiner*—Mark L. Bell
*Assistant Examiner*—Michael A. Marcheschi
*Attorney, Agent, or Firm*—Thomas R. Weaver

[57] ABSTRACT

A composition for and method of dispersing particles of hydraulic cement in a slurry of hydraulic cement in water, wherein the composition is the reaction product of a ketone, an aldehyde, a cyanide and, optionally, a sulfite. The dispersant properties of the composition can be enhanced by further reacting the composition with hydroxide.

20 Claims, No Drawings

ACETONE/FORMALDEHYDE/CYANIDE RESINS

BACKGROUND OF THE INVENTION

1. Technical Field of the Invention

This invention broadly relates to hydraulic cement compositions. It further and more specifically relates to materials used to disperse particles of hydraulic cement in water. Such materials, when employed in the art of subterranean well cementing and depending upon the desired function of the material, are sometimes referred to as dispersants or as dispersing agents, sometimes as densifiers or as densifying agents, sometimes as viscosity reducing agents and sometimes as friction reducing agents.

The invention also relates to a method of cementing a conduit in a borehole penetrating a subterranean formation comprising the use of a slurry of hydraulic cement in water containing a dispersant.

2. Related Art and Problems Solved

When dry hydraulic cement is mixed with water to form a slurry of cement in water, it has been observed that individual particles of the cement tend to attract, agglomerate or otherwise stick together. Such attraction can result in the prevention of adequate wetting of the cement by the mixing water and thus interfere with the complete hydration reaction between the cement and the water. It has also been observed that the attraction phenomenon can be eliminated or at least reduced and the wettability of the cement increased by adding to the slurry an appropriate quantity of a material which is believed to cause the individual particles of cement in the slurry to repel one another and thus to promote dispersion of the particles in the aqueous phase of the slurry. Such materials are, therefore, called dispersants or dispersing agents.

It has also been observed that a slurry of cement in water in which the individual cement particles are not dispersed has a viscosity greater than a slurry of cement in water in which the individual cement particles are dispersed. Thus, with all parameters remaining identical except for the presence or absence of a dispersant, the viscosity of a cement slurry can be reduced by adding to the slurry an appropriate quantity of a dispersant. For a more complete discussion of dispersion see *Well Cementing*, Erik B. Nelson (Editor) Chapter 3-7 "Dispersants", pages 3-18 to 3-24, Elsevier Science Publishing Company, Inc., 1990.

In view of the above it is apparent why dispersants have been referred to as viscosity reducers or as viscosity reducing agents; and, further, since viscosity is known to contribute to frictional resistance in fluid flow, it is also apparent why dispersants have been referred to as friction reducers or as friction reducing agents.

In another aspect, since dispersants, as explained above, function to help increase the wettability of individual cement particles, this function enables the use of decreased quantities of mixing water, without change in slurry viscosity, to thereby result in the increase in density of the resulting cement slurry. Accordingly, dispersants have also been referred to as densifiers or as densifying agents.

There is a considerable body of prior U.S. Patents dealing with materials used to disperse particles of hydraulic cement in water. One such patent is U.S. Pat. No. 4,818,288 to Aignesberger and Plank which discloses a dispersant for a salt-containing cement slurry consisting of the condensation product of a ketone, an aldehyde and a compound for introducing acid groups into the condensation product. The preferred compound disclosed in Aignesberger, et al., for introducing acid groups are sulfites and particularly, sodium sulfite.

DISCLOSURE OF INVENTION

This invention provides a composition of matter which is useful for dispersing particles of hydraulic cement in water. For purposes of convenience, the composition shall be hereinafter referred to as a dispersant or as the dispersant of this invention depending upon the context.

The dispersant of this invention, in its broadest form, is the product of the reaction of a minimum of three different chemical species. This particular product is sometimes, for convenience, referred to as Product I.

In another aspect, the dispersant of this invention is the product of the reaction of four different chemical species. This particular product is sometimes, for convenience, referred to as Product II.

Three of the four species used to make Product II are used to make Product I.

The three species common to Product I and Product II are a ketone, an aldehyde and an alkali metal or an alkaline earth metal cyanide. The fourth species used to make Product II is an alkali metal or an alkaline earth metal sulfite.

In another aspect, the dispersant of this invention is the product of the reaction of Product I and an alkali metal or an alkaline earth metal hydroxide. This particular product is sometimes, for convenience, referred to as Product III.

In still another aspect, the dispersant of this invention is the product of the reaction of Product II and an alkali metal or an alkaline earth metal hydroxide. This particular product is sometimes, for convenience, referred to as Product IV.

The dispersant of this invention, that is, Products I-IV, does disperse hydraulic cement in fresh water and salt water. The term fresh water means water containing substantially no dissolved sodium chloride, and the term salt water means water which contains sodium chloride in amounts up to saturation, i.e., about 37.2 pounds of sodium chloride per 100 pounds of water.

The most satisfactory dispersion results for both fresh water and salt water are provided by Products II and IV. From the data in the Examples provided below it can be seen that Products II and IV and a prior art dispersant disclosed in Aignesberger, et al., (mentioned above) provide similar dispersion results in fresh water; however, it can also be seen that the dispersion results in salt water for Products II and IV are far superior to the dispersion results obtained with the prior art dispersant.

It can also be seen from data in the Examples that dispersant (X), a physical mixture of a prior art dispersant (W) and a Product I dispersant (V) produces substantially inferior dispersion results compared to the results produced by a Product II dispersant (K), in both fresh water and salt water. The dispersion results provided by the dispersant of this invention, and particularly by Products II and IV are surprising and unexpected.

Very satisfactory dispersion results can be achieved when the sum of the mole fractions of the ketone reactant and the aldehyde reactant is greater than about 0.5, preferably greater than about 0.7 and still more preferably greater than about 0.75.

DESCRIPTION OF THE PREFERRED EMBODIMENTS

As previously mentioned, the dispersant of this invention is, broadly, the reaction product of a ketone, an aldehyde and a cyanide. The reaction is preferably conducted in two steps, the first comprising heating an aqueous solution of a ketone and a cyanide to a temperature in the range of from about 40° to about 60° C. Satisfactory results have been obtained by heating the solution to a temperature of about 56° C. When a desired temperature is attained, then an aldehyde reactant is added to the heated solution in the second step.

The aldehyde addition causes an exothermic reaction to commence which produces a consequent increase in the temperature of the reaction mass. The rate of addition of the aldehyde to the reaction mass should therefore be adjusted to preferably maintain a constant temperature of the mass at a value in the range of from about 65° to about 100° C. until all of the aldehyde is added. Satisfactory results have been obtained by adding aldehyde at a rate sufficient to maintain the reaction temperature at a value in the upper portion of the indicated range such as about 80° C. and above.

After all of the aldehyde has been added, the reaction may be terminated by permitting the reaction mass to cool. However, it has been observed that the dispersant properties of the reaction product are apparently enhanced by maintaining the temperature of the reaction mass at the temperature attained as a result of the addition of the aldehyde. The period of time for maintaining the temperature after all of the aldehyde has been added to the reaction can be up to about 120 minutes. It is believed that an indicator of the time to maintain reaction temperature after addition of all aldehyde in order to obtain enhancement of the dispersant properties of the reaction product is the multiplication product of the reaction temperature and time of temperature maintenance. A reaction-time temperature of about 6000° C.-minutes has been observed to produce a reaction product having very satisfactory dispersant properties.

The reaction product is in an aqueous solution having pH of about 12 to 13. The product may be used in the aqueous phase or dried to a solid powder form. The pH of the aqueous phase may be adjusted to a neutral value.

In another aspect of this invention, it has been discovered that the dispersant properties of the reaction product can be still further enhanced by including a very small quantity of sulfite in the aqueous solution of ketone and cyanide, as previously described, prior to the addition of aldehyde. Other than the inclusion of sulfite the process for making the reaction product as above described is not changed.

The quantity of ketone employed herein to make the reaction product of this invention is an amount in the range of from about 0.1 to about 0.6, preferably from about 0.15 to about 0.45 and still more preferably from about 0.2 to about 0.3 mole fraction ketone of the total number of moles of reactants employed in the reaction. A preferred embodiment contains 0.224 mole fraction ketone. Another preferred embodiment contains 0.295 mole fraction ketone.

The quantity of aldehyde employed herein to make the reaction product of this invention is an amount in the range of from about 0.2 to about 0.7, preferably from about 0.35 to about 0.65 and still more preferably from about 0.5 to about 0.6 mole fraction aldehyde of the total number of moles of reactants employed in the reaction. A preferred embodiment contains 0.53 mole fraction aldehyde. Another preferred embodiment contains 0.581 mole fraction aldehyde.

Very satisfactory dispersion results can be obtained when the sum of the mole fractions of the ketone reactant and the aldehyde reactant employed is greater than about 0.5, preferably greater than about 0.7 and still more preferably greater than about 0.75.

The quantity of cyanide employed herein to make the reaction product of this invention is an amount in the range of from about 0.05 to about 0.4, preferably from about 0.075 to about 0.35 and still more preferably from about 0.1 to about 0.25 mole fraction cyanide of the total number of moles of reactants employed in the reaction. A preferred embodiment contains 0.12 mole fraction cyanide. Another preferred embodiment contains 0.202 mole fraction cyanide.

The quantity of sulfite employed herein to make the reaction product of this invention is an amount in the range of from 0 to about 0.15, preferably from about 0.03 to about 0.12 and still more preferably from about 0.04 to about 0.09 mole fraction sulfite of the total number of moles of reactants employed in the reaction. A preferred embodiment contains 0.044 mole fraction sulfite. Another preferred embodiment contains 0.088 mole fraction sulfite.

It is clear from the above that the process for making the reaction product of this invention does not require the use of a sulfite reactant. It is also clear, as shown in the below examples, that the inclusion in the reaction of a very small mole fraction of sulfite reactant can significantly enhance the dispersant properties of the reaction product of this invention.

The quantity of cyanide or the quantity of cyanide and sulfite employed should be in an amount sufficient to yield a water soluble product. It is believed that the concentration ranges for these reactants as disclosed above, include quantities of cyanide and sulfite sufficient to yield a water soluble reaction product.

Water is employed in the reaction solely as a solvent for the reactants and for the produced reaction product. It is believed that an amount of water sufficient to serve the solvent function is equal to about 2 to 3 times the weight of ketone reactant employed.

The ketones employed herein have the general structure

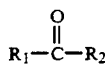

wherein $R_1$ and $R_2$ are each selected from aromatic, saturated aliphatic and unsaturated aliphatic hydrocarbon radicals and mixtures thereof having in the range of from 1 to 12 carbon atoms. $R_1$ or $R_2$ can be the same or different, however, it is preferred that either $R_1$ or $R_2$ be a non-aromatic radical.

Examples of ketones within the scope of the above defined structure include, but are not limited to phenylmethyl ketone, methyl-ethyl ketone, diethyl ketone, methyl-butyl ketone, methyl-vinyl ketone and acetone. Acetone is preferred The aldehydes employed herein have the general structure

wherein $R_3$ is selected from aromatic, saturated aliphatic and unsaturated aliphatic hydrocarbon radicals and mixtures thereof having in the range of from 1 to 12 carbon atoms.

Examples of aldehydes within the scope of the above defined structures include, but are not limited to formaldehyde, benzaldehyde, acetaldehyde, butyraldehyde and acrolein.

The currently preferred aldehyde is formaldehyde.

The cyanides employed herein are selected from hydrogen cyanide, alkali metal cyanides and alkaline earth metal cyanides. Examples of cyanides preferred for use herein include sodium cyanide, potassium cyanide and lithium cyanide with sodium cyanide being the most preferred.

The sulfites employed herein are selected from alkali metal sulfites and alkaline earth metal sulfites. Examples of sulfites preferred for use herein include lithium sulfite, potassium sulfite, sodium sulfite and sodium bisulfite with sodium sulfite being the most preferred.

The reaction products made as described above are, for convenience, referred to as reaction Product I and reaction product II. Reaction Product I does not include a sulfite reactant. Reaction Product II does include a sulfite reactant.

Reaction products I and II can be reacted with a quantity of alkali metal or alkaline earth metal hydroxide to thereby produce reaction products III and IV respectively. The purpose this reaction is to improve the dispersant properties of reaction products I and II. As seen in the examples below, reaction Product III, produced by reacting hydroxide with reaction Product I, has dispersant properties superior to those of reaction Product I; and reaction product IV, produced by reacting hydroxide with reaction product II, has dispersant properties superior to those of reaction Product II.

It is believed that the hydroxide converts nitrile groups in the reaction products to carboxylate groups. Accordingly, the quantity of hydroxide employed is based upon the number of moles of cyanide employed in the making of the reaction product I or II as the case may be. In view of the above, the number of moles of hydroxide employed is in the range of from about 0.5 to about 2 times the number of moles of cyanide employed in the making of the initial reaction product.

The quantities of reaction product (I or II) and hydroxide to be reacted are placed in contact and heated to the boiling point for a time in the range of from about 2 to about 6 hours. The resulting aqueous solution is ready for use as a dispersant as is or the water solvent can be removed to produce a dry powder which then may be used as a dispersant.

The hydroxide may be either alkali metal or alkaline earth metal such as sodium hydroxide, potassium hydroxide or calcium hydroxide.

In use, the dispersant of this invention is added to a slurry of hydraulic cement in water in an amount effective to disperse the individual particles of hydraulic cement in the water. An effective dispersing amount is believed to be an amount in the range of from about 0.1 to about 5.0 preferably 0.1 to 2.0 pounds of dispersant per 100 pounds of hydraulic cement. The quantities of dispersant and hydraulic cement disclosed are on a dry basis. A currently preferred quantity of dry dispersant to be employed is about 0.5 pound per 100 pounds of hydraulic cement.

The term "hydraulic cement" as used herein means all inorganic cementitious materials of known type which comprise compounds of calcium, aluminum, silicon, oxygen and/or sulfur which exhibit "hydraulic activity", that is, which set solid and harden in the presence of water. Cements of this type include common Portland cements, fast setting or extra fast setting, sulfate resistant cements, modified cements, alumina cements, high alumina cements, calcium aluminate cements and cements which contain secondary components such as fly ash, pozzalona and the like.

Portland cements are classified by the American Society of Testing Materials (ASTM) into five major types identified by Roman Numerals I, II, III, IV and V and by the American Petroleum Institute into at least 9 categories identified by the letters A, B, C, D, E, F, G, H and J. The classifications are based on chemical composition and physical properties.

The term "hydraulic cement" as used herein also includes a material identified as slag and mixtures thereof with Portland cement.

"Slag", as used herein, means a granulated, blast furnace, by-product formed in the production of cast iron and is broadly comprised of the oxidized impurities found in iron ore.

During the operation of a blast furnace to remove iron from iron ore a molten waste product is formed. By preventing this molten product from crystallizing, and thereby losing its energy of crystallization, a supercooled liquid or non-crystalline glassy material can be formed thus retaining the energy of crystallization. This non-crystalline, glassy material, which has also been described as a vitreous substance free from crystalline substances as determined by X-ray diffraction analysis, is said to be capable of exhibiting hydraulic activity upon being reduced in size by grinding from a particle size of 1 to 5 millimeters to a fine particle size in the range of from about 1 to about 100 microns.

Crystallization of the molten blast-furnace waste product can be prevented and the super cooled liquid or glass can be formed by rapidly chilling the molten waste. This rapid chilling can be effected by spraying the molten waste with streams of water which operation causes rapid solidification and formation of a water slurry of small, glassy, sand-like particles. The slurry is then thermally dried to remove substantially all moisture to thereby produce a dry blend of coarse particles. This dry blend of particles, having a particle size in the range of 1 to 5 millimeters, is then ground to reduce particle size to values in the range of from 1 to about 100 microns and preferably less than about 225 mesh (45 microns) to produce the granulated, blastfurnace by-product herein defined as "Slag".

The hydraulic cement useful herein can also include small particle size cement which consists of discrete cement particles of hydraulic cement having diameters no larger than about 30 microns, preferably no larger than about 17 microns, and still more preferably no larger than about 11 microns. The distribution of various sized particles within the cementitious material, i.e., the particle size distribution, features 90 percent of them having a diameter not greater than about 25 microns, preferably about 10 microns and still more preferably about 7 microns, 50 percent having a diameter not greater than about 10 microns, preferably about 6 microns and still more preferably about 4 microns and 20 percent of the particles having a diameter not greater than about 5 microns, preferably about 3 microns and still more preferably about 2 microns.

Small particle size cement is more fully discussed in Ewert, et al., U.S. Pat. No. 5,121,795.

The quantity of water employed in the formulation of the slurry of cement in water useful herein is dependent upon the particle size of cement employed. Thus, the quantity of water employed herein to produce the slurry of hydraulic cement is an amount in the range of from about 0.25 to about 5.0 pounds of water per pound of dry hydraulic cement. For cements having a particle size of less than about 45 microns the preferred water to cement ratio is in the range of from about 1.0 to about 2.0 pounds of water per pound of cement. For cements which have a particle size greater than about 45 microns the preferred water to cement ratio is in the range of from about 0.3 to about 0.6 pounds of water per pound of cement.

Slurries of hydraulic cement in water which contain the dispersant of this invention are employed in the conventional processes known for conducting primary and remedial cementing operations in oil and gas well cementing arts.

Preparation of Dispersants

Dispersants of this invention utilized in the experiments described below can be prepared as follows:

Deionized water, acetone and sodium cyanide are placed in a three-neck, round bottom flask equipped with a thermometer, a reflux condenser and an addition funnel. The resulting solution is then heated to a temperature in the range of from about 40° C. to about 60° C. When a desired temperature within the above range is attained, formaldehyde is then added to the flask through the addition funnel. The formaldehyde initiates an exothermic reaction which causes the temperature of the reaction mixture to rise. The rate of addition of formaldehyde to the reacting mixture is adjusted to maintain the reaction temperature at a value in the range of from about 65° C. to about 100° C. After all the formaldehyde is added, the maximum temperature attained during the addition of formaldehyde is maintained for a period of time in the range of from about 0 to about 120 minutes. In this regard note Tables 1A through 5A, below, wherein the columns headed "Reaction Time/Temperature" record the maximum temperature and time referred to above. Note these columns also record the product of maximum temperature and time in units of °C.-minutes. This unit will be further referred to below.

The reaction product produced as a result of the above described process, which is referred to as Product I, is in the form of an aqueous solution having a pH of about 12 to 13.

It is believed that Product I can be characterized by any of several structures, a simple one of which is the following:

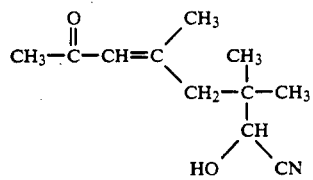

The above theoretical structure would involve the reaction of at least 3 moles of acetone, 1 mole of sodium cyanide and 1 mole of formaldehyde. It is believed, however, that Product I is actually a much larger molecule having a structure more complex than the one shown above. Whatever the structure of Product I, the important feature of the reaction product is the presence of the nitrile group (—C≡N) or groups in the molecule.

The actual recipes employed for making some of the various Product I dispersants according to the process described above are set out in Table 4A, below.

The water included in the process functions solely as a solvent for the ingredients and reaction product. The amount of water employed is equal to about 2 to 3 times the weight of acetone employed.

Some dispersants of this invention, utilized in the experiments described below, in addition to the ingredients used to make Product I, also include as a reactant a quantity of sodium sulfite.

The dispersant examples of this invention made with acetone, formaldehyde, sodium cyanide and sodium sulfite produce a reaction product referred to as Product II. The reaction conditions involved in making Product II are the same as for Product I except that sodium sulfite is also included in the initial charge to the three-neck flask as previously described.

The actual recipes employed for making some of the various Product II dispersants according to the process described above are set out in Table 2A, below.

It is believed that the structure of the Product II dispersant can be similar to structure (1), previously drawn, except that the Product II structure includes both sulfonate groups (—SO$_2$O$^-$) and nitrile groups (—C≡N).

Each of Products I and II can be reacted with sodium hydroxide to produce hydrolyzed materials identified herein as Product III and Product IV. Product III is hydrolyzed Product I, Table 3A, and Product IV is hydrolyzed Product II, Table 1A. Notice from Table 1A and Table 3A that the molar quantity of hydroxide employed is in the range of 1 to 2 times the molar quantity of cyanide employed.

Products I, II, III and IV all include sodium cyanide as an essential ingredient in the recipe for making a dispersant and are thus within the scope of this invention.

Table 5A discloses dispersants which are not within the scope of this invention because they do not include sodium cyanide as one of the reactants for making the dispersant. However, the dispersants included in Table 5A are made in substantial accordance with the method previously described for making Products I, II, III and IV.

The material identified in Table 5A as dispersant A-2 is believed to be comparable to the dispersant disclosed in U.S. Pat. No. 4,818,288 under Example A-2 (Column 5, line 55 et seq.).

TABLE 1A

| Dispersant Product IV | Reactant | | | | Reaction Conditions | | | Hydrolysis Reaction | |
|---|---|---|---|---|---|---|---|---|---|
| | Acetone Moles | Formaldehyde Moles | Sodium Cyanide Moles | Sodium Sulfite Moles | Reaction Time/Temperature | | | Sodium Hydroxide Moles | Time Hours |
| | | | | | Temperature °C. | Time Minutes | °C.- Minutes | | |
| R | 1.11 | 2.63 | 1 | 0.22 | 100 | 60 | 6000 | 1 | 4 |
| Q | 1.11 | 2.63 | 1 | 0.22 | 65 | 90 | 5850 | 1 | 4 |
| O | 1.11 | 2.63 | 1 | 0.22 | 85 | 30 | 2550 | 1 | 4 |
| P | 0.83 | 2.5 | 1 | 0.42 | 85 | 30 | 2550 | 1 | 4 |
| S | 0.83 | 2.5 | 1 | 0.42 | 100 | 60 | 6000 | 1 | 4 |

TABLE 2A

| Dispersant Product II | Reactant | | | | Reaction Conditions | | | Hydrolysis Reaction | |
|---|---|---|---|---|---|---|---|---|---|
| | Acetone Moles | Formaldehyde Moles | Sodium Cyanide Moles | Sodium Sulfite Moles | Reaction Time/Temperature | | | Sodium Hydroxide Moles | Time Hours |
| | | | | | Temperature °C. | Time Minutes | °C.- Minutes | | |
| K | 1.11 | 2.63 | 1 | 0.22 | 100 | 60 | 6000 | 0 | 0 |
| I | 1.11 | 2.63 | 1 | 0.22 | 65 | 90 | 5850 | 0 | 0 |
| M | 0.83 | 2.5 | 1 | 0.42 | 100 | 60 | 6000 | 0 | 0 |
| N | 0.67 | 2.33 | 1 | 0.2 | 100 | 60 | 6000 | 0 | 0 |
| J | 1.11 | 2.63 | 1 | 0.22 | 85 | 30 | 2550 | 0 | 0 |
| L | 0.83 | 2.5 | 1 | 0.42 | 85 | 30 | 2550 | 0 | 0 |

TABLE 3A

| Dispersant Product III | Reactant | | | | Reaction Conditions | | | Hydrolysis Reaction | |
|---|---|---|---|---|---|---|---|---|---|
| | Acetone Moles | Formaldehyde Moles | Sodium Cyanide Moles | Sodium Sulfite Moles | Reaction Time/Temperature | | | Sodium Hydroxide Moles | Time Hours |
| | | | | | Temperature °C. | Time Minutes | °C.- Minutes | | |
| H | 1 | 1.58 | 1 | 0 | 65 | 35 | 2275 | 1.0 | 4 |
| G | 1 | 1.58 | 1 | 0 | 75 | 30 | 2250 | 2.0 | 4 |

TABLE 4A

| Dispersant Product I | Reactant | | | | Reaction Conditions | | | Hydrolysis Reaction | |
|---|---|---|---|---|---|---|---|---|---|
| | Acetone Moles | Formaldehyde Moles | Sodium Cyanide Moles | Sodium Sulfite Moles | Reaction Time/Temperature | | | Sodium Hydroxide Moles | Time Hours |
| | | | | | Temperature °C. | Time Minutes | °C.- Minutes | | |
| A | 2.38 | 4.69 | 1 | 0 | 85 | 5 | 425 | 0 | 0 |
| C | 4.76 | 2.81 | 1 | 0 | 70 | 40 | 2800 | 0 | 0 |
| D | 1 | 2.37 | 1 | 0 | 75 | 30 | 2250 | 0 | 0 |
| B | 4.76 | 3.76 | 1 | 0 | 75 | 30 | 2250 | 0 | 0 |
| E | 0.57 | 1.63 | 1 | 0 | 75 | 30 | 2250 | 0 | 0 |
| V | 1.11 | 2.63 | 1 | 0 | 100 | 60 | 6000 | 0 | 0 |
| F | 1 | 1.58 | 1 | 0 | 75 | 30 | 2250 | 0 | 0 |

TABLE 5A

| Dispersant | Reactant | | | | Reaction Conditions | | | Hydrolysis Reaction | |
|---|---|---|---|---|---|---|---|---|---|
| | Acetone Moles | Formaldehyde Moles | Sodium Cyanide Moles | Sodium Sulfite Moles | Reaction Time/Temperature | | | Sodium Hydroxide Moles | Time Hours |
| | | | | | Temperature °C. | Time Minutes | °C.- Minutes | | |
| A-2 | 2 | 5.7 | 0 | 1 | 85 | 30 | 2550 | 0 | 0 |
| T | 2 | 5.7 | 0 | 1 | 85 | 30 | 2550 | 1 | 4 |
| W | 1.11 | 2.63 | 0 | 0.22 | 100 | 60 | 6000 | 0 | 0 |

Testing of Dispersants

The dispersants identified in Tables 1A–5A were tested to determine the ability of each one to disperse particles of hydraulic cement in water. The test results, reported in Tables 1B–5B, are actually the apparent viscosities of cement slurries consisting of API Class H Cement, 33 pounds of water (no added salt) per 100 pounds of cement and 0.5 pounds of dispersant per 100 pounds of cement. The data provided in each "B" table are the test results for the dispersants prepared as shown in the corresponding "A" Table. The dispersant concentration reported is on a dry basis and the slurry water requirement includes the water solvent of the respective reaction product.

After preparing each slurry it was stirred for 20 minutes in an atmospheric consistometer and then the apparent slurry viscosity was determined with a Fann viscometer (Model 35 SA, Rotor-Bob-R1B1) using a No. 2 spring.

The apparent viscosity measurements, which are reported in Tables 1B-5B, are recorded for four Fann shear settings (100, 200, 300 and 600 RPM) at 100° F. The Fann readings for each sample are then combined to obtain on average apparent viscosity. The various apparent viscosities are then compared. For purposes of evaluation, it is assumed that the lower the apparent average viscosity the better the ability of the material to disperse cement.

TABLE 1B

SLURRY APPARENT VISCOSITY
API Class H Cement, 33 lb Water per 100 lb Cement,
0.5 lb Dispersant per 100 lb Cement,
0 lb Sodium Chloride per 100 lb Water

| Dispersant Product IV | FANN DATA AT 100° F. | | | | AVERAGE Viscosity |
|---|---|---|---|---|---|
| | 600 RPM Viscosity | 300 RPM Viscosity | 200 RPM Viscosity | 100 RPM Viscosity | |
| R | 124 | 50 | 32 | 16 | 55.5 |
| Q | 130 | 60 | 32 | 20 | 60.5 |
| O | 126 | 60 | 40 | 20 | 61.5 |
| P | 134 | 70 | 48 | 28 | 70 |
| S | 168 | 108 | 70 | 40 | 96.5 |

TABLE 2B

SLURRY APPARENT VISCOSITY
API Class H Cement, 33 lb Water per 100 lb Cement,
0.5 lb Dispersant per 100 lb Cement,
0 lb Sodium Chloride per 100 lb Water

| Dispersant Product II | FANN DATA AT 100° F. | | | | AVERAGE Viscosity |
|---|---|---|---|---|---|
| | 600 RPM Viscosity | 300 RPM Viscosity | 200 RPM Viscosity | 100 RPM Viscosity | |
| K | 136 | 60 | 40 | 24 | 65 |
| I | 132 | 80 | 60 | 24 | 74 |
| M | 150 | 96 | 76 | 48 | 92.5 |
| N | 160 | 114 | 84 | 56 | 103.5 |
| J | 172 | 120 | 92 | 52 | 109 |
| L | 170 | 120 | 90 | 58 | 109.5 |

TABLE 3B

SLURRY APPARENT VISCOSITY
API Class H Cement, 33 lb Water per 100 lb Cement,
0.5 lb Dispersant per 100 lb Cement,
0 lb Sodium Chloride per 100 lb Water

| Dispersant Product III | FANN DATA AT 100° F. | | | | AVERAGE Viscosity |
|---|---|---|---|---|---|
| | 600 RPM Viscosity | 300 RPM Viscosity | 200 RPM Viscosity | 100 RPM Viscosity | |
| H | 170 | 110 | 80 | 44 | 101 |
| G | 220 | 154 | 120 | 82 | 144 |

TABLE 4B

SLURRY APPARENT VISCOSITY
API Class H Cement, 33 lb Water per 100 lb Cement,
0.5 lb Dispersant per 100 lb Cement,
0 lb Sodium Chloride per 100 lb Water

| Dispersant Product I | FANN DATA AT 100° F. | | | | AVERAGE Viscosity |
|---|---|---|---|---|---|
| | 600 RPM Viscosity | 300 RPM Viscosity | 200 RPM Viscosity | 100 RPM Viscosity | |
| A | 200 | 130 | 110 | 80 | 130 |
| C | 220 | 150 | 106 | 50 | 131.5 |
| D | 204 | 150 | 110 | 70 | 133.5 |
| B | 260 | 140 | 100 | 60 | 140 |
| E | 226 | 174 | 148 | 110 | 164.5 |
| V | 332 | 262 | 224 | 180 | 249.5 |
| F | 370 | 270 | 224 | 170 | 258.75 |

TABLE 5B

SLURRY APPARENT VISCOSITY
API Class H Cement, 33 lb Water per 100 lb Cement,
0.5 lb Dispersant per 100 lb Cement,
0 lb Sodium Chloride per 100 lb Water

| Dispersant | FANN DATA AT 100° F. | | | | AVERAGE Viscosity |
|---|---|---|---|---|---|
| | 600 RPM Viscosity | 300 RPM Viscosity | 200 RPM Viscosity | 100 RPM Viscosity | |
| A-2 | 128 | 62 | 46 | 26 | 65.5 |
| T | 186 | 110 | 74 | 40 | 102.5 |
| X* | 296 | 236 | 210 | 172 | 228.5 |
| W | 318 | 240 | 232 | 170 | 240 |
| NONE | 380 | 266 | 220 | 160 | 256.5 |

*NOTE: Dispersant X is a physical mixture consisting of 60 wt percent dispersant V (Table 4A) and 40 wt percent dispersant W (Table 5A).

Table 5B, included for control purposes, indicates the results obtained for a slurry containing no dispersant, a slurry containing dispersant A-2 (U.S. Pat. No. 4,818,288) and one containing dispersant T, a version of dispersant A-2 which had been contacted with sodium hydroxide. Notice that the dispersion result for each of A-2 and T is substantially superior to the result obtained with a slurry containing no dispersant. However, the results obtained with dispersant T is decidedly inferior to the result obtained with dispersant A-2.

The results obtained with Product I (Table 4B, no sulfite and not hydrolyzed), with the exception of Sample F, show viscosity improvement in a fresh water slurry; however, dispersants A-2 and T each reflect dispersal ability superior to Product I. Sample F and the sample containing no dispersant produced substantially the same result.

The results obtained with Product III (Table 3B, no sulfite but hydrolyzed) show substantial viscosity improvement in a fresh water slurry. Note Product III, dispersant G, is the hydrolyzed version of Product I, dispersant F. Note further Product III, dispersant H, contains the same reactants as F, but the reaction time/-Temperature product was slightly higher than that for F. The result obtained with dispersant H is substantially the same as obtained with dispersant T.

The results obtained with Product II (Table 2B, sulfite present but no hydrolysis) show substantial viscosity improvement in a fresh water slurry. Note Product II, dispersants M, N, J and L, obtained results very similar to that obtained with dispersant T (Table 5B). Also note Product II, dispersants K and I, obtained results similar to that obtained with dispersant A-2. Note further the substantial improvement in result obtained with dispersant K as compared to dispersant J wherein the only apparent difference between K and J is that the product of reaction time and temperature of K is greater than that of J.

The results obtained with Product IV (Table 1B, sulfite present and hydrolyzed) shows substantial improvement in apparent viscosity in a fresh water slurry. Product IV, dispersant R, the hydrolyzed version of Product II, dispersant K, shows a result superior to that obtained with prior art dispersant A-2 (Table 5B).

The effect of the product of reaction time and temperature on apparent viscosity is demonstrated by comparing the viscosity result of dispersant R (55.5) with the viscosity result of dispersant 0 (61.5). The product of reaction time and temperature for dispersant R is 6000° C.-minutes, for dispersant 0 the product is 2550° C.-minutes with other parameters constant.

The effect of the combination of hydrolysis and the product of reaction time and temperature is demonstrated by comparing the viscosity result of Product IV, dispersant R, (55.5) with the viscosity result of Product II, dispersant J (109).

Tables 1-5 all demonstrate dispersant results in a fresh water cement slurry (0 lb sodium chloride per 100 lb water). Tables 6 and 7 demonstrate dispersant results in a slurry having 18 lb sodium chloride and 37.2 lb sodium chloride per 100 lb water respectively. In this regard compare the results shown in Tables 5B (Control), 6 and 7. Tables 6 and 7 contain results obtained with Product IV, dispersant R, (Table 1A) and Product II, dispersant K, (Table 2A) in addition to the control materials included in Table 5B.

The results reveal that dispersants R and K were at least equal to if not far superior to the results in both fresh water and salt water slurries when compared to the results obtained with the control materials.

It is interesting to note from Table 7 that the viscosity of a cement slurry made with saturated salt water (37.2 lb sodium chloride per 100 lb water) which does not include a dispersant is approximately the same as a slurry which contains dispersant A-2 and a slurry which contains dispersant T.

TABLE 6

SLURRY APPARENT VISCOSITY
API Class H Cement, 33 lb Water per 100 lb Cement,
0.5 lb Dispersant per 100 lb Cement,
0 lb Sodium Chloride per 100 lb Water

| Dispersant | FANN DATA AT 100° F. | | | | AVERAGE Viscosity |
|---|---|---|---|---|---|
| | 600 RPM Viscosity | 300 RPM Viscosity | 200 RPM Viscosity | 100 RPM Viscosity | |
| R | 128 | 60 | 44 | 24 | 64 |
| K | 148 | 80 | 60 | 36 | 81 |
| A-2 | 164 | 100 | 80 | 36 | 95 |
| NONE | 174 | 115 | 91 | 66 | 111.5 |
| W | 192 | 130 | 104 | 72 | 124.5 |
| T | 198 | 130 | 102 | 70 | 125 |
| X* | 294 | 226 | 194 | 156 | 217.5 |

*NOTE: Dispersant X is a physical mixture consisting of 60 wt percent dispersant V (Table 4A) and 40 wt percent dispersant W (Table 5A).

TABLE 7

SLURRY APPARENT VISCOSITY
API Class H Cement, 33 lb Water per 100 lb Cement,
0.5 lb Dispersant per 100 lb Cement,
0 lb Sodium Chloride per 100 lb Water

| Dispersant | FANN DATA AT 100° F. | | | | AVERAGE Viscosity |
|---|---|---|---|---|---|
| | 600 RPM Viscosity | 300 RPM Viscosity | 200 RPM Viscosity | 100 RPM Viscosity | |
| K | 130 | 70 | 50 | 30 | 70 |
| R | 148 | 90 | 66 | 34 | 84.5 |
| NONE | 166 | 110 | 86 | 60 | 105.5 |
| T | 174 | 124 | 90 | 52 | 110 |
| A-2 | 176 | 116 | 90 | 60 | 110.5 |
| X | 242 | 186 | 154 | 118 | 175 |

What is claimed:

1. A composition useful to disperse particles of hydraulic cement in water wherein said composition is made by the reaction of at least three different compounds said compounds being selected from a ketone, as a first compound, an aldehyde, as a second compound, and an alkali or alkaline earth metal cyanide as a third compound, to thereby produce a first reaction product: wherein the mole fraction of said ketone present in said reaction is an amount in the range of from about 0.1 to about 0.6; the mole fraction of said aldehyde present in said reaction is an amount in the range of from about 0.2 to about 0.7; and the mole fraction of said cyanide present in said reaction is an amount in the range of from about 0.05 to about 0.4.

2. The composition of claim 1 wherein said reaction further includes an alkali or alkaline earth metal sulfite, as a fourth compound, to thereby produce a second reaction product wherein the mole fraction of said sulfite present in said reaction is an amount in the range of from about 0.03 to about 0.15.

3. The composition of claim 1 wherein the mole fraction of said aldehyde in said reaction is at least about 0.35 and the mole fraction of said ketone in said reaction is at least about 0.15.

4. The composition of claim 2 wherein the mole fraction of said sulfite in said reaction is at least about 0.04, the mole fraction of said aldehyde is at least about 0.5 and the mole fraction of said cyanide is no more than about 0.35.

5. The composition of claim 1 wherein said first reaction product is reacted with an alkali or an alkaline earth metal hydroxide to thereby produce a third reaction product wherein the number of moles of said hydroxide employed to produce said third reaction product is at least equal to 0.5 of the number of moles of said cyanide employed to produce said first reaction product.

6. The composition of claim 2 wherein said second reaction product is reacted with an alkali metal hydroxide to thereby produce a fourth reaction product wherein the number of moles of said alkali metal hydroxide employed to produce said fourth reaction product is at least equal to the number of moles of said alkali metal cyanide employed to produce said second reaction product.

7. A hydraulic cement composition comprised of a slurry of hydraulic cement in water and said first reaction product of claim 1 present in said slurry in an amount in the range of from about 0.1 to about 5 pounds of said first reaction product per 100 pounds of hydraulic cement.

8. A hydraulic cement composition comprised of a slurry of hydraulic cement in water and said second reaction product of claim 2 present in said slurry in an amount in the range of from about 0.1 to about 5 pounds of said second reaction product per 100 pounds of hydraulic cement.

9. A hydraulic cement composition comprised of a slurry of hydraulic cement in water and said third reaction product of claim 5 present in said slurry in an amount in the range of from about 0.1 to about 5 pounds of said third reaction product per 100 pounds of hydraulic cement.

10. A hydraulic cement composition comprised of a slurry of a hydraulic cement in water and said fourth reaction product of claim 6 present in said slurry in an amount in the range of from about 0.1 to about 5 pounds of said fourth reaction product per 100 pounds of hydraulic cement.

11. A method of dispersing particles of hydraulic cement in a slurry of hydraulic cement in water comprising combining with said slurry an effective amount of a dispersant composition made by the reaction of a ketone, an aldehyde, an alkali metal or an alkaline earth metal cyanide and, optionally, an alkali metal or an alkaline earth metal sulfite; wherein, on a mole fraction basis of the reactants in said reaction, said ketone is present in said reaction in an amount in the range of from about 0.15 to about 0.45 mole fraction, said aldehyde is present in said reaction in an amount in the range of from about 0.35 to about 0.65 mole fraction, said cyanide is present in said reaction in an amount in the range of from about 0.075 to about 0.35 mole fraction an said sulfite is present in said reaction in an amount in the range of from 0 to about 0.15 mole fraction.

12. The method of claim 11 wherein said ketone is represented by the general structure $$R_1COR_2$$

wherein $R_1$ and $R_2$ are each selected from aromatic and aliphatic hydrocarbon radicals and mixtures thereof having in the range of from 1 to 12 carbon atoms; said aldehyde is represented by the general structure $$R_3COH$$

wherein $R_3$ is selected from aromatic and aliphatic hydrocarbon radicals and mixtures thereof having in the range of from 1 to 12 carbon atoms; said cyanide is selected from hydrogen cyanide, alkali metal cyanides and alkaline earth metal cyanides; and said sulfite is selected from alkali metal sulfites and alkaline earth metal sulfites.

13. The method of claim 12 wherein said dispersant composition, prior to said combining with said slurry, is reacted with a quantity of hydroxide selected from alkali metal and alkaline earth metal hydroxide wherein the quantity of hydroxide employed is in the range of from about 0.5 to about 2 times the number of moles of cyanide employed to make said dispersant.

14. The method of claim 13 wherein said ketone is selected from phenyl-methyl ketone, methyl-ethyl ketone, diethyl ketone, methyl-butyl ketone, methyl-vinyl ketone and acetone.

15. The method of claim 14 wherein said aldehyde is selected from formaldehyde, benzaldehyde, acetaldehyde, butyraldehyde and acrolein.

16. The method of claim 12 wherein said dispersant is present in said slurry in an amount in the range of from about 0.1 to about 5 pounds of dispersant per 100 pounds of hydraulic cement.

17. The method of claim 16 wherein said water is selected from fresh water and salt water.

18. The method of claim 12 wherein said dispersant is present in said slurry in an amount in the range of from about 0.1 to about 5 pounds of dispersant per 100 pounds of hydraulic cement and wherein said water is selected from fresh water and salt water.

19. The method of claim 18 wherein said ketone is acetone present in said reaction in the range of from 0.2 to 0.3 mole fraction; said aldehyde is formaldehyde present in said reaction in the range of from 0.5 to 0.6 mole fraction; said cyanide is sodium cyanide present in said reaction in the range of from 0.1 to 0.25 mole fraction; and said sulfite is sodium sulfite present in said reaction in the range of from 0.04 to 0.09 mole fraction.

20. The method of claim 19 wherein said dispersant composition, prior to said combining with said slurry, is reacted with a quantity of hydroxide selected from alkali metal and alkaline earth metal hydroxide wherein the quantity of hydroxide employed is in the range of from about 0.5 to about 2 times the number of moles of cyanide employed to make said dispersant.

* * * * *